Patented Apr. 10, 1951

2,548,091

UNITED STATES PATENT OFFICE 2,548,091

ALPHA-HALOGEN SUBSTITUTED ACRYLIC COMPOUNDS

Carl E. Barnes, Belvidere, N. J., and William O. Ney, Jr., Easton, Pa., assignors to General Aniline & Film Corporation, New York, N. Y., a corporation of Delaware No Drawing. Application June 23, 1945, Serial No. 601,342

15 Claims. (Cl. 260—89.5)

This invention relates to the production and polymerization of monomeric α-halogen substituted acrylic compounds to yield colorless polymers and to the polymers obtained from such compounds. More particularly, the invention relates to the preparation of esters of α-chloracrylic acids, and especially methyl α-chloracrylate and to the polymerization thereof to yield colorless polymers and to the polymers obtained therefrom.

Alpha-halogen substituted acrylic compounds have heretofore been described in the art. The esters of α-halogen substituted acrylic acids are of particular interest since their polymers, particularly that of methyl α-chloracrylate, possess outstanding hardness and a high softening point coupled with thermoplastic properties which render them highly desirable in the field of plastics. To obtain the highest degree of hardness in the polymer, it is necessary to heat the polymer at a temperature of above 100° C. for a considerable length of time. Unfortunately, this heating results in a strong yellow discoloration appearing in the polymer. The discoloration also occurs when the polymer is permitted to stand at room temperature for any considerable length of time. The exposure of the polymer to ultraviolet light also results in a strong discoloration. As a result of the tendency of the polymer to discolor, its use as a plastic material has been seriously curtailed. For this reason, it finds no practical use as a substitute for glass, particularly in the field of optical glass, such as lenses, prisms, windows, and windshields where completely colorless products are required.

Attempts to obtain a polymer of the α-chloracrylates which is free from the tendency to discolor during heating, and/or when exposed to ultraviolet light or when permitted to stand for extended periods of time have heretofore been unsuccessful. While various procedures for eliminating the tendency to form color are proposed in the prior art, complete prevention of color is not obtained. Thus, in U. S. Patent 2,314,443, granted to Crawford, the discoloration of the polymer is stated to be due to the presence in the monomer of traces of so-called "autooxidation" products. In this patent, it is proposed to reduce the tendency to form color by removing the autooxidation products by distilling the monomer in a vacuum in the absence of oxygen and carrying out the polymerization in the absence of oxygen. Another proposal made in this patent is to destroy the autooxidation products by use of solutions of various reducing agents or compounds having a labile oxygen atom together with alkaline compounds followed by distillation to remove the destroyed autooxidation products. However, a polymer which is resistant to discoloration when heated is not obtained as is pointed out in the patent. Thus, while diminution in the color formation is obtained, the best product still has a color as measured by the Lovibond tintometer of red 0.3 Lovibond unit and yellow 0.8 Lovibond unit.

In U. S. Patent 2,345,126, it is stated that while the process of U. S. Patent 2,314,443 results in diminishing the extent of color formation in the polymer, complete suppression of the yellow color does not generally result. It is proposed in U. S. Patent 2,345,126 to further reduce this tendency to develop yellow color. According to this patent, esters of α-haloacrylic acids are first rendered substantially free from autooxidation products and then have incorporated therein a polyhydric alcohol or a partial ester or ether thereof as a stabilizer. In this patent, the least colored product obtained still has a total of .8 Lovibond unit when heated for 16 hours at a temperature of 100 to 110° C. and 1.4 Lovibond units when heated at the same temperature for 160 hours.

In U. S. Patent 2,247,790 granted to Strain et al., it is proposed to overcome the tendency to form color in the polymer by conducting the polymerization under substantially anhydrous conditions. However, while the patent states that a clear and water-white polymer is obtained, we have found that the polymer tends to discolor when heated for long periods of time or subjected to ultraviolet light.

It is an object of our invention to provide monomers of α-halogen substituted acrylic compounds, and more particularly the esters thereof, which yield polymers that are free from color and show no tendency to subsequently develop color when subjected to heat and/or ultraviolet light, or upon standing at ordinary room temperature for extended periods of time.

It is a further object of our invention to provide polymers of α-halogen substituted acrylic compounds, and more particularly the esters thereof, which are resistant to the tendency to form yellow discoloration when subjected to heat and/or ultraviolet light or upon standing for extended period of time.

A further object of our invention is to provide polymers of esters of α-haloacrylic acids which are highly heat resistant, scratch resistant, transparent, and tough and which are free from the tendency to discolor when subjected to heat or ultraviolet light for extended periods of time.

It is a still further object of our invention to provide polymers of esters of α-haloacrylic acid which are of improved hardness, can be readily cast or molded to produce various shaped articles for various uses, including optical bodies of improved heat resistance and which do not tend to discolor when subjected to high temperatures and/or to ultraviolet light.

Another object of the invention is to provide a thermoplastic resin which may be readily shaped by molding, such as, for example, injection or compression molding, to form shaped articles which retain their shape, remain transparent, and free from color even when subjected to boiling water or higher temperatures.

It is another object of our invention to provide polymers of esters of α-haloacrylic acids which form optical mediums which are non-brittle and substantially unbreakable, of superior scratch resistance and transparency and which may be shaped by grinding and polishing operations without exhibiting a tendency to gum or smear during the process and which are resistant to the formation of color when subjected to heat and/or ultraviolet light for extended periods of time.

While various theories have been advanced to explain the formation of yellow color in polymers from esters of α-haloacrylic acid, we have now found and determined that the agent responsible for this color is an oxalyl halide which has the following formula:

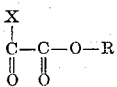

where X stands for the same halogen which is substituted in the α-position in the monomer, and R is the same ester-forming radical as in the monomer. Thus, in the case of methyl α-chloracrylate, we have found that the agent responsible for the discoloration is methyl oxalyl chloride:

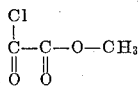

Alpha-haloacrylic compounds undergo oxidation very rapidly when exposed to oxygen. This results in the formation of a peroxide which we believe to have the probable formula:

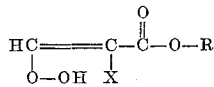

and wherein R and X have the same significance as above.

The peroxide itself does not cause discoloration in polymer. However, when the monomer containing this peroxide is allowed to stand at room temperature, the oxalyl halide compound is produced. At higher temperatures such, for example, as those encountered in polymerization, the compound forms more rapidly. The oxalyl halide, such as the methyl oxalyl chloride, is not the direct cause of the color since it is itself colorless. However, we have found that when it is present in the monomer, the resulting polymer is always colored. This has been conclusively established by the following experiment:

A freshly prepared and purified sample of methyl α-chloracrylate was polymerized. The polymer formed was only slightly yellow. When 0.01% of methyl oxalyl chloride was added to this monomer, the polymer obtained under otherwise identical conditions was strongly or deeply yellow in color.

We, accordingly, believe that the reasons why no one heretofore succeeded in preparing a polymer of an α-halogen substituted acrylic compound free from the tendency to discolor is that no one heretofore had ever prepared a monomer of an α-halogen substituted acrylic compound free from or stabilized against the existence of the oxalyl halide compound which we have found to be responsible for formation of color in the polymer, or that no one had so treated the known monomers as to modify this component so that any present, or any that might be formed during polymerization of the monomers or subsequent thereto would be converted into a product that does not cause color formation.

From a consideration of the properties of methyl oxalyl chloride and methyl α-chloracrylate, it is apparent that the prior art proposals to produce colorless polymers would not result in the monomer free from the oxalyl halide compound. Thus, methyl oxalyl chloride, which is described in Beilstein, vol. 2 (fourth edition), page 541, has a boiling point of 118 to 120° C. Methyl α-chloracrylate has a boiling point of 120 to 123° C. Thus, it will be seen that the proposal of U. S. Patent 2,314,443 to purify the monomer by distilling would not result in a monomer free from methyl oxalyl chloride since the boiling point of the two substances are substantially the same, and the methyl oxalyl chloride would not be separated from the monomer by the distillation. Nor do the chemical methods proposed in this patent remove the oxalyl halide compound from the monomer or any that may be present in the polymer as a result of the presence of incompletely polymerized monomer therein.

Likewise, a completely colorless polymer is not obtained according to the procedure of U. S. Patent 2,345,126 since the polyhydric alcohols and derivatives proposed therein possess such a low solubility in the monomer that there is insufficient present in the monomer to react with all the oxalyl halide present therein or formed during polymerization or subsequently thereto.

Nor does the distillation and drying procedure followed in U. S. Patent 2,247,790 remove the oxalyl halide compound with the result that the polymer of this patent on prolonged heating also exhibits color-forming tendencies.

We, accordingly, believe that α-halogen substituted acrylic acid derivatives free from the corresponding oxalyl halide compounds, and in particular methyl chloracrylate free from methyl oxalyl chloride, and capable of forming a colorless polymer, are new compounds which differ in kind from the monomers heretofore known and produced, and possess a new utility not possessed by the prior monomers. We believe that we are the first to make available an α-halogen acrylic acid derivative free from the corresponding oxalyl halide compound, and, therefore, capable of polymerizing to a polymer which is free from the tendency to form color.

According to our invention, we provide a monomeric α-halogen substituted acrylic compound free from the oxalyl halide responsible for color formation. Our invention comprises treating the monomer with any substance which will prevent the existence of the oxalyl halide compound in the monomer and polymer. More particularly, our invention comprises incorporating in the monomer any substance which in itself does not introduce color and which converts the oxalyl halide compound into a non-color-forming compound to produce a monomer capable of yielding a colorless polymer when the so-treated monomer is polymerized. To be practically effective, the substance should be soluble in the monomer in sufficient amount to react with all of the oxalyl halide, not only that originally present but also that which may be formed during polymerization, or in the polymer after it is prepared. In addition, the reagent utilized must react with the oxalyl halide to convert it into an inert compound faster than the oxalyl halide reacts to form colored compounds.

Numerous compounds have been found useful for rendering the oxalyl halide compound inert and producing a monomer capable of forming a colorless polymer. Suitable are the esters of alcohols and inorganic acids described in patent application Serial No. 601,343, filed June 23, 1945, now U. S. Patent 2,515,686, as, for example, dipropyl sulfite, ethyl sulfate, glycol sulfate, ethylene chlorohydrin; the partial esters of polyhydric alcohols with polymerizable unsaturated acids as, for example, diethylene glycol maleate, ethylene glycol monoacrylate, ethylene glycol monomethacrylate, which are described in patent application Serial No. 601,344, filed June 23, 1945; esters of organic hydroxyacids as, for example, vinyl, isopropenyl, methyl, ethyl, $\beta$-hydroxyethyl esters of hydracrylic and glycollic acids, which are described in patent application Serial No. 601,345, filed June 23, 1945, now U. S. Patent 2,514,305. Contrary to the teaching of U. S. Patent 2,247,790 which proposes to polymerize under anhydrous conditions, water has been found to be an effective agent for rendering the oxalyl halide present in the monomer inert and to yield under certain conditions a monomer capable of producing a colorless polymer, as described in patent application Serial No. 601,346, filed June 23, 1945, now U. S. Patent 2,501,647.

However, compounds which we have found highly desirable for the purposes of our invention are the lower molecular weight monohydric alcohols in which the hydroxyl group is attached to a hydrocarbon radical. As examples of suitable alcohols are mentioned methyl, ethyl, n-propyl, isopropyl, n-butyl, secondary-butyl, tertiary-butyl, amyl, cyclohexyl, allyl, methallyl, crotyl, benzyl, and cinnamyl alcohols. In particular, we prefer to use methyl alcohol. The methyl alcohol is miscible in all proportions with the $\alpha$-haloacrylic monomer and is highly reactive with the oxalyl halide compound. Thus, the presence of sufficient of this compound is always assured to render inert any oxalyl halide present in the monomer or which may be formed during polymerization or subsequent thereto.

While our invention is specifically illustrated hereinafter by reference to the use of the monohydric alcohols, it is to be understood that the invention is broader and comprises the use of any substance sufficiently soluble in the monomer and sufficiently reactive which converts the oxalyl halide compound into a non-color-forming compound to produce a monomer which is capable of yielding a colorless polymer.

According to our invention, the incorporation in the esters of $\alpha$ haloacrylic acids of compounds capable of rendering the oxalyl halide inert is attended by many advantages. Thus, it is unnecessary to carry out the polymerization of the monomer in the absence of air. Nor is it necessary to take precautions against hydrolysis. Our process also makes it unnecessary to first destroy the so-called autooxidation products in the monomer as proposed in U. S. Patents 2,314,443 and 2,345,126. Rigid precautions need not be taken to prevent exposure of the monomer to air either during storage or polymerization. Nor is it necessary to dehydrate the monomer prior to distillation. The presence of autooxidation products becomes immaterial as long as the compound is incorporated in the monomer in a sufficient amount to convert the oxalyl chloride already present, or which may be formed, into a non-color-forming compound.

The monomers which we use may be obtained by any well-known method. It is desirable to purify the monomer by the ordinary fractional distillation methods to remove as much of the various impurities therein as possible. The nature of the impurities, of course, depends on the method of synthesis of the monomer.

In general, we prepare monomeric methyl $\alpha$-chloracrylate by dehydrohalogenating methyl $\alpha,\alpha$- or $\alpha,\beta$-dichloropropionate. We prefer, however, to utilize the process described in patent application Serial No. 601,347, filed June 23, 1945, now U. S. Patent 2,476,528. According to this process, the dichloropropionate is dehydrohalogenated by use of a solution of a salt of an organic acid, such as sodium acetate, the proportion being approximately 1 mol of the dichloropropionate to 1 mol of the alkali metal salt. The mixture is refluxed at a temperature of 105° C. for about 3 hours. The reaction mixture formed is washed with water and then with a mild alkali, such as sodium bicarbonate, to remove acetic acid formed during the reaction. The mixture may be further washed with water and then dried with a suitable dehydrating agent, such as anhydrous sodium sulfate, or other suitable drying medium. The crude freshly prepared methyl $\alpha$-chloroacrylate thus obtained is then fractionally distilled, under vacuum, the fraction up to 44° C. at 33 millimeters pressure being discarded and the second fraction from 44 to 45° C. at 30 millimeters being distilled in a 30-inch Vigreux column at a temperature of 20 to 21° C. and at a pressure of about 5 millimeters. The forerun of about 10% is discarded and a middle fraction boiling at 20 to 21° C. at 5 millimeters pressure is collected and utilized for the purposes of our invention. A residue of approximately 10% of the original volume is left in the still. To the freshly distilled monomer thus obtained we add the monohydric alcohol in proportions which may range from 0.1 to 15%.

The addition of the monohydric alcohol is equally effective in preventing discoloration of the polymer whether the so-treated monomer is polymerized by either thermal- or photo-polymerization methods. In accordance with our invention, for example, massive cast pieces of polymers of esters of $\alpha$-halo-acrylic acids may be made which possess exceptional clarity, transparency, and freedom from color and maintain these properties even upon exposure to ultraviolet light and/or elevated temperatures for extended periods of time.

Since the amount of oxalyl halide present in the monomer depends largely on the extent of contact of monomer with atmospheric oxygen, the quantity of monohydric alcohol incorporated in the monomer depends to some extent upon the atmospheric oxygen with which the monomer is likely to come into contact prior to and during the polymerization. The addition of larger amounts of the alcohol will allow the monomer to tolerate longer exposures to oxygen without the formation of color. Thus, for example, if 5% by volume of methanol is added to the monomer, polymerization may be carried out in vessels unsealed from the air and in which no especial effort is made to exclude air during the polymerization. Under these conditions, on the other hand, if the methanol is omitted, a polymer is obtained which develops a strong yellow color upon heating and/or exposure to light or simply on standing under ordinary room conditions for an extended period of time.

Of course, if the polymerization is carried out with more care in excluding air, correspondingly less of the alcohol need be added to the monomer. In general, however, the amount of the monohydric alcohol incorporated into the monomer depends upon the amount of the oxalyl halide which may be present. Where larger quantities of this color-forming agent are present, larger amounts of the alcohol are added to the monomer. Also, if the polymerization is carried out in the presence of oxygen or if the monomer is to be stored in the presence of oxygen for any considerable length of time, the amount of alcohol added should be sufficient to take care of any of the oxalyl halide which may be formed as a result of such exposure of the monomer to oxygen or air in addition to that already present.

However, we have found that regardless of the exposure of the monomer to oxygen or air, the alcohols, such as methyl, ethyl, and propyl alcohols, because of their complete miscibility with the monomer may be added in sufficient amounts to take care of the conversion of any amount of oxalyl halide which may be present or which may be formed in the monomer or during polymerization thereof. However, for practical purposes, the amount added should be less than that which causes appreciable softening of the polymer or causes it to become opaque. While the alcohol might be miscible in the monomer in all proportions, its miscibility in the polymer is generally less than in the monomer and, accordingly, alcohol which is not dissolved in the polymer may cause opacity therein. In general, where a transparent polymer is desired, the amount of the alcohol added should not exceed approximately 10 to 15% in the case of methanol, since otherwise the immiscible portion may render the polymer opaque. The presence of the alcohol dissolved in the polymer will render inert any oxalyl halide which may form from any incompletely polymerized monomer in the polymer and thus further insures against the formation of any color in the polymer.

Where quantities of the monohydric alcohols are used which may cause softening of the polymer, such softening may be overcome by replacing part of the alcohol by water. It has been found, as described in patent application Serial No. 601,346, filed June 23, 1945, that the presence of water in the monomer up to the limit of its solubility in the monomer is also effective in eliminating the tendency of the polymer to discolor. However, where large quantities of oxalyl halide may be present in the monomer, water alone because of its low solubility in the monomer may be insufficient to convert all the oxalyl halide present in addition to that which may be formed, into a non-color-forming compound.

Instead of adding the alcohol to the monomer immediately before polymerization, the alcohol may be added to the monomer before distillation as, for example, in the still, in those cases where it is desired to distill the monomer prior to polymerization. For this purpose, we may use an alcohol having the proper vapor pressure to distill off with the monomeric derivative of the $\alpha$-haloacrylic acid being distilled. When methyl $\alpha$-chloracrylate is the monomer utilized, alcohols boiling between 115–120° C. or those higher boiling alcohols which form azeotropic mixtures may be suitably used for this purpose. As examples of suitable alcohols may be mentioned, n-butanol, diethyl carbinol, methyl n-propyl carbinol, symmetrical-tetramethyl-ethyl alcohol and benzyl alcohol. A sufficient amount of the alcohol should be present in the distilled monomer to react with any oxalyl halide that may be subsequently formed as, for example, during polymerization. For other derivatives of $\alpha$-haloacrylic acids, other alcohols having suitable boiling points may be readily selected.

The following examples are illustrative of our invention, all parts being by weight except where otherwise specifically indicated.

*Example 1*

0.08 part of benzoyl peroxide was dissolved in 800 parts of methyl $\alpha$-chloracrylate, and one-half of the material was poured through the air into a glass vessel and sealed off. To the other half was added 4 parts of methanol and after mixing, the material was poured through the air into a glass vessel and sealed to prevent evaporation. Both these samples were polymerized by heating at 35° C. for 24 hours, followed by 12 hours' heating at 65° C. and finally by heating at 115° C. for 24 hours. At the end of this time, the glass was broken away from the hard resin and the piece to which methanol had been added was found to be hard, clear, and completely colorless. The portion to which methanol had not been added, however, although hard and clear, had a distinct yellowish discoloration.

A polished cylindrical specimen, 10 centimeters in length, of the polymer prepared from the alcohol-treated monomer was kept in a standard Fadeometer for 96 hours. When taken out no color was evident therein when compared with a similar cylinder of standard optical glass. Test samples of the polymer prepared in the same manner have been permitted to stand at room temperatures for about a year without formation of any yellow color.

*Example 2*

The procedure in Example 1 was repeated except that 4 parts of ethanol were employed in place of the methanol. The resulting polymer was found to be colorless.

*Example 3*

The procedure in Example 1 was repeated using 5 parts of propanol in place of the methanol. The resulting polymer was found to be colorless.

*Example 4*

Methyl $\alpha$-chloracrylate was poured through the air into a glass tube. Two percent of tertiary-butyl alcohol, containing a small amount of benzoyl peroxide dissolved therein, were added and the tube sealed off. After polymerizing according to the method of Example 1, a hard, clear, colorless, resin was obtained. A portion of the same monomer to which tertiary-butyl alcohol had not been added formed a polymer having a distinct yellowish color.

Example 5

100 parts of methyl α-chloracrylate were poured through the air into a glass vessel. 4 parts of methanol, containing 0.02 part of benzoyl peroxide, were added and the vessel corked with an ordinary cork stopper covered with aluminum foil. The material was polymerized as in preceding examples and the finished polymer was found to be hard, clear, and completely colorless. A portion of the same monomer when polymerized in the same way but to which no alcohol was added was badly discolored with a deep yellow color.

Example 6

0.08 part of benzoyl peroxide was dissolved in 800 parts of methyl α-chloracrylate. 1.6 parts of methanol were then dissolved in the material and the mixture was then saturated with water to the limit of the solubility of the water in the monomer. This wet mixture was poured through the air into a narrow-mouthed glass vessel and corked with an ordinary cork stopper covered with aluminum foil to prevent evaporation. Polymerization was effected by the method employed in Example 1 and after the final heating at 115° C., the glass was broken away from the hard resin which was found to be clear and colorless.

A polymer obtained in the same manner, but in which no methanol and water were added to the monomer was distinctly colored yellow. It will be seen that by using water, the amount of alcohol required to prevent discoloration can be reduced.

Example 7

100 parts of methyl α-chloracrylate were dissolved in 200 parts of freshly distilled chloroform. To this solution 0.1 part of benzoyl peroxide and 20 parts of methanol were added. The mixture was then heated to 60° C. for 2 hours, after which time the polymerized methyl α-chloracrylate was precipitated as a molding powder by the addition of 400 parts of methanol with rapid stirring. After filtering, washing with methanol, and drying, the powder was molded at 160 to 170° C. to form a hard, transparent, colorless piece.

A molded polymer made in the identical manner from a portion of the same monomer but to which no alcohol was added was badly discolored with a deep brownish-yellow color after the molding operation.

While the invention has been described in the specific examples in connection with methyl α-chloracrylate, it is also applicable to other α-halogen substituted acrylic compounds.

By the term "α-halogen substituted acrylic acid compounds," we intend to include the esters, amides, substituted amides, and nitriles of halocrylic acids, as well as the acids. Among such derivatives suitable for use in the present invention in addition to those already disclosed in the examples may be mentioned: ethyl, propyl, butyl, phenyl, benzyl, cyclohexyl, allyl, methallyl, esters of α-chloro- and α-bromoacrylic acids; α-bromo- and α-chloroamides or N-substituted derivatives thereof, such as α-chloracrylamide, N-methyl - α - chloracrylamide, and the corresponding α-bromo compounds; and α-chloracrylonitrile and the like. In general, our invention has been found effective to eliminate color formation in polymers prepared from polymerizable α-halogen substituted acrylic compounds.

The temperature of polymerization may range from about 20° C. or below to about 120° C., although the preferred range is from about 35 to 65° C. The subsequent heating step in order to harden the polymer may range from about 100 to about 120° C., the time being from about 8 to 24 hours.

Either light or any suitable catalyst may be used to promote the polymerization, such as oxygen-containing catalysts, as, for example, benzoyl peroxide, succinyl peroxide, peracetic acid, and other peroxide or oxygen containing catalysts.

Since it is apparent that the invention may be varied without departing from the spirit and scope thereof, it is to be understood that it is not limited to the specific embodiments given above, but only in accordance with the appended claims.

We claim:

1. The process of producing colorless, color-stable, transparent mass polymers, form-stable at a temperature of 100° C., from monomeric polymerizable α-halogen substituted acrylic acid compounds, which consists in dissolving in the monomer from 0.1 to 15% of a monohydric alcohol having at most 9 carbon atoms and in which the hydroxyl radical is attached to a hydrocarbon radical, the amount of said alcohol being sufficient to convert all of the oxalyl halide compounds formed by spontaneous oxidation of the monomer prior to and during polymerization thereof into colorless, inert, organic reaction products, without exceeding the limit of solubility of any residual unreacted portion of said alcohol and its oxalyl halide reaction products in the resulting polymer, and without causing appreciable softening of said polymer; and then mass polymerizing, by subjecting to polymerizing influences, the resulting monomer composition, stabilized against discoloration, thus obtained.

2. The process of producing colorless, color-stable, transparent mass polymers, form-stable at a temperature of 100° C., from monomeric polymerizable α-halogen substituted acrylic esters, which consists in dissolving in the monomer from 0.1 to 15% of a monohydric alcohol having at most 9 carbon atoms and in which the hydroxyl radical is attached to a hydrocarbon radical, and then mass polymerizing, by subjecting to polymerizing influences, the resulting monomer composition, stabilized against discoloration, thus obtained.

3. The process of producing colorless, color-stable, transparent mass polymers, form-stable at a temperature of 100° C., from monomeric polymerizable α-halogen substituted acrylic esters, which consists in dissolving in the monomer from 0.1 to 15% of methyl alcohol, and then mass polymerizing, by subjecting to polymerizing influences, the resulting monomer composition, stabilized against discoloration, thus obtained.

4. The process of producing colorless, color-stable, transparent mass polymers, form-stable at a temperature of 100° C., from monomeric polymerizable α-halogen substituted acrylic esters, which consists in dissolving in the monomer from 0.1 to 15% of ethyl alcohol, and then mass polymerizing, by subjecting to polymerizing influences, the resulting monomer composition, stabilized against discoloration, thus obtained.

5. The process of producing colorless, color-stable, transparent mass polymers, form-stable at a temperature of 100° C., from monomeric polymerizable α-halogen substituted acrylic esters, which consists in dissolving in the monomer from 0.1 to 15% of propyl alcohol, and then mass polymerizing, by subjecting to polymerizing influences, the resulting monomer composition, stabilized against discoloration, thus obtained.

6. The process of producing a colorless, color-stable, transparent mass polymer, form-stable at a temperature of 100° C., from methyl α-chloracrylate, which consists in dissolving in the monomer from 0.1 to 15% of a monohydric alcohol having at most 9 carbon atoms, and in which the hydroxyl radical is attached to a hydrocarbon radical, and then mass polymerizing, by subjecting to polymerizing influences, the resulting monomer composition, stabilized against discoloration, thus obtained.

7. The process of producing a colorless, color-stable, transparent mass polymer, form-stable at a temperature of 100° C., from methyl α-chloracrylate, which consists in dissolving in the monomer from 0.1 to 15% of methyl alcohol, and then mass polymerizing, by subjecting to polymerizing influences, the resulting monomer composition, stabilized against discoloration, thus obtained.

8. The process of producing a colorless, color-stable, transparent mass polymer, form-stable at a temperature of 100° C., from methyl α-chloracrylate, which consists in dissolving in the monomer, from 0.1 to 15% of ethyl alcohol, and then mass polymerizing, by subjecting to polymerizing influences, the resulting monomer composition, stabilized against discoloration, thus obtained.

9. The process of producing a colorless, color-stable, transparent mass polymer, form-stable at a temperature of 100° C., from methyl α-chloracrylate, which consists in dissolving in the monomer from 0.1 to 15% of propyl alcohol, and then mass polymerizing, by subjecting to polymerizing influences, the resulting monomer composition, stabilized against discoloration, thus obtained.

10. The process of producing colorless, color-stable, transparent mass polymers, form-stable at a temperature of 100° C., from monomeric polymerizable α-halogen substituted acrylic acid compounds, which consists in dissolving in the monomer from 0.1 to 15% of a monohydric alcohol having at most 9 carbon atoms and in which the hydroxyl radical is attached to a hydrocarbon radical, and substantially immediately thereafter mass polymerizing, by subjecting to polymerizing influences, the resulting monomer composition, stabilized against discoloration, thus obtained.

11. The process of producing colorless, color-stable, transparent mass polymers, form-stable at a temperature of 100° C., from monomeric polymerizable α-halogen substituted acrylic acid compounds, which consists in dissolving in the monomer containing impurities separable therefrom by distillation, from 0.1 to 15% of a monohydric alcohol having at most 9 carbon atoms and in which the hydroxyl radical is attached to a hydrocarbon radical, said alcohol being so selected as to its boiling point as to remain with the monomer upon distillation of the mixture of monomer and alcohol, distilling the resulting mixture of monomer and alcohol so as to recover a mixture of the pure monomer with said alcohol, and mass polymerizing, by subjecting to polymerizing influences, the resulting freshly distilled mixture of monomer and alcohol, stabilized against discoloration, thus obtained.

12. A colorless, color-stable, transparent mass polymer, form-stable at a temperature of 100° C., prepared by a process as defined in claim 1.

13. A colorless, color-stable, transparent mass polymer, form-stable at a temperature of 100° C., prepared by a process as defined in claim 7.

14. A colorless, color-stable, transparent mass polymer, form-stable at a temperature of 100° C., prepared by a proces as defined in claim 8.

15. A colorless, color-stable, transparent mass polymer, form-stable at a temperature of 100° C., prepared by a process as defined in claim 9.

CARL E. BARNES.
WILLIAM O. NEY, Jr.

REFERENCES CITED

The following references are of record in the file of this patent:

UNITED STATES PATENTS

| Number | Name | Date |
|---|---|---|
| 2,314,443 | Crawford et al. | Mar. 23, 1943 |
| 2,387,571 | Fikentscher et al. | Oct. 23, 1945 |
| 2,413,716 | Kenyon et al. | Jan. 7, 1947 |

FOREIGN PATENTS

| Number | Country | Date |
|---|---|---|
| 411,860 | Great Britain | June 13, 1934 |

OTHER REFERENCES

Marvel et al.: "The Structure of Vinyl Polymers," Jour. Amer. Chem. Society, vol. 61, November 1939, pages 3156–3160.